Jan. 18, 1927.
A. R. TRIST
1,614,857
CONTROL DEVICE OPERATED BY CHANGE OF LIQUID LEVEL
Filed Dec. 15, 1921   2 Sheets-Sheet 2
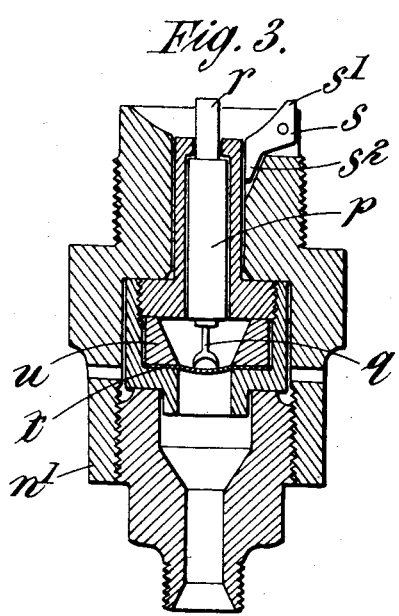
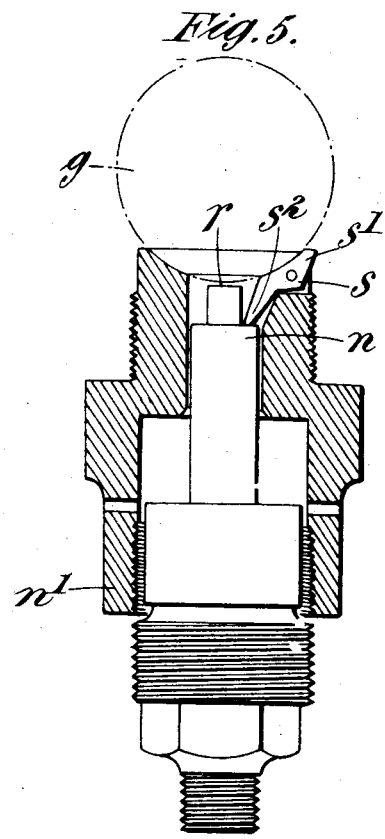
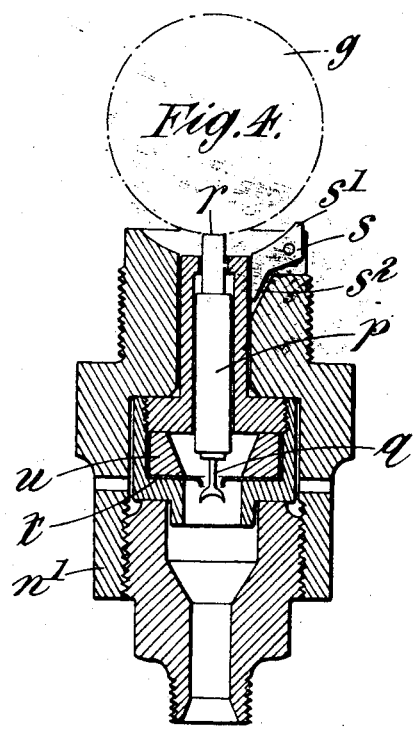
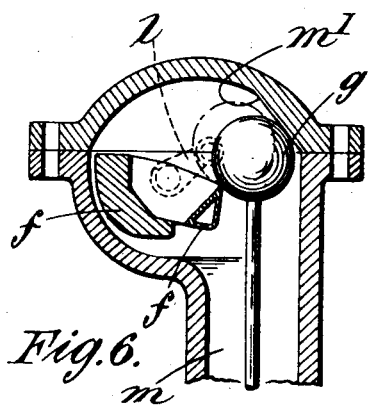
Inventor,
Arthur R. Trist
Per,
Francis E. Boyce
Atty.

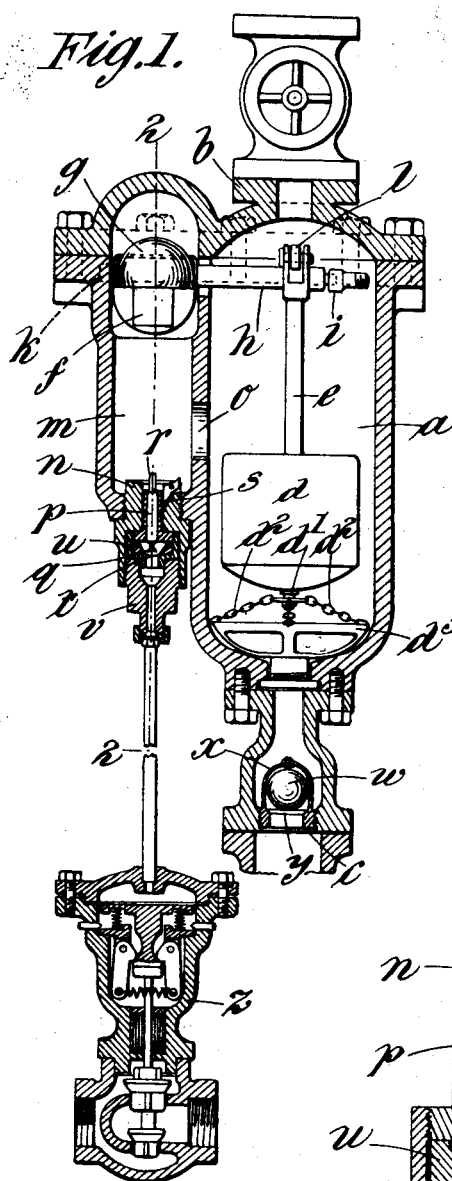

Patented Jan. 18, 1927.

1,614,857

UNITED STATES PATENT OFFICE.

ARTHUR RONALD TRIST, OF LONDON, ENGLAND.

CONTROL DEVICE OPERATED BY CHANGE OF LIQUID LEVEL.

Application filed December 15, 1921, Serial No. 522,656, and in Great Britain January 7, 1921.

This invention relates to improvements in control devices operated by change of liquid level and has for its object the provision of means whereby efficient control may be more readily obtained than with known devices.

The invention consists in the arrangement of a float within a vessel connected to a receptacle the change of liquid level within which operates the device; this float is associated with means adapted to discharge an element, when said float reaches a predetermined position, said element directly or indirectly perforating a diaphragm and permitting fluid under pressure to operate a control device.

In order that the invention may be the better understood I will now proceed to describe the same in relation to the accompanying drawings, reference being had to the letters and figures marked thereon. Like letters refer to like parts in the various figures in which:—

Fig. 1 is a sectional elevation of a device constructed in accordance with this invention.

Fig. 2 is a sectional elevation of Fig. 1 on the line 2—2.

Fig. 3 is an enlarged detail sectional view of the device containing the perforable diaphragm in place ready for operation.

Fig. 4 is an enlarged detail sectional view somewhat similar to Fig. 3 but showing the position of the parts after the weight has fallen.

Fig. 5 is an enlarged detail view showing the operation of the detent which prevents reassembly of the parts until the weight is replaced.

Fig. 6 illustrates a method of replacing the weight.

Fig. 7 is a detail sectional view of a repair unit.

The drawings illustrate one form of device adapted to enable the supply of liquid fuel to the burners of a boiler to be discontinued or reduced upon the level of the water within the said boiler reaching a predetermined level.

Within a vessel $a$ connected to the boiler by connections $b$ and $c$ so disposed relative thereto that the level of the water within the vessel $a$ corresponds with the water level in the boiler is disposed a float or the like $d$ which is connected by a rod $e$ to a pivoted frame $f$ adapted to contain an element $g$. The frame $f$ is mounted on a shaft $h$ pivoted at $i$ and $k$ said shaft $h$ being mechanically associated with the rod $e$ by means of a lever $l$.

In proximity with the vessel $a$ is arranged a chamber $m$ so disposed as to receive the element $g$ when it is discharged from its frame $f$ and direct its fall so that it contacts with the part $r$ of a device $n$ located in the lower part of said chamber $m$, the chamber $m$ being connected with the vessel $a$ by means of the portway $o$.

The device $n$ is located in a housing $n'$ screwed into the lower part of the chamber $m$ and comprises a plunger $p$ carrying a perforating device $q$ the head $r$ of said plunger $p$ receiving the impact of the falling element $g$. The housing $n'$ is provided with a pivoted detent $s$ the end $s'$ of which is engaged by the element $g$ when it is discharged. When the element $g$ engages with the end $s'$ of the detent $s$ the detent $s$ is deflected and its end $s^2$ engages with the device $n$ as illustrated in Fig. 5 and prevents reinsertion of the device $n$ after removal thereof to replace the diaphragm $t$ until the element $g$ has been replaced. The diaphragm $t$ is disposed beneath the perforating device $q$ and is supported in place by a fitting $u$.

To prevent undue oscillation of the float $d$ its lower extremity $d'$ has chains $d^2$ attached thereto said chains $d^2$ being also attached to a device $d^3$ located in the base of the vessel $a$ sufficient slackness being allowed in the chains to allow of proper operation of float $d$ during use.

In apparatus controlled by the level of liquid in a receptacle as hereinbefore described, difficulty is experienced in obtaining certainty of action owing to the disturbing influence of the movement of the liquid due for example to the pitching or rolling of the ship on which the apparatus is installed with the result that the level controlled apparatus becomes erratic in action.

To obviate this a check device of a particular character is interposed between the vessel $a$ and the boiler containing the fluid the level of which is the controlling factor. This check device comprises a ball $w$ having a small factor of buoyancy in the liquid the said ball $w$ comprising a thin hollow metal shell suitably loaded with cork or the like. The ball $w$ is contained in a cage or similar device $x$ having a seat $y$ which is located in the connection between the vessel $a$ and the boiler. Normally, when there is little or no movement of liquid, the ball $w$ takes up a position away from the seat $y$ and free communication between the vessel $a$ and the boiler exist. When however, the level in the vessel $a$ suddenly drops the rapid movement of the liquid overcomes the small amount of buoyancy of the ball $w$ and drags it downward into contact with the seat $y$ and prevents the level in the vessel $a$ from being materially reduced. Immediately the conditions become normal the ball $w$ again rises and free communication is restored.

In operation, as the water level falls in the boiler the water lever will fall in the vessel $a$ associated therewith and the float $d$ will descend and rotate the frame $f$ about its pivots $i$ and $k$. When the water level reaches a predetermined point the element $g$ will be discharged from the frame $f$, pass through the chamber $m$, contact with the end $r$ of the plunger $p$ and force the perforating device $q$ through the diaphragm $t$ thus allowing the fluid pressure above the said diaphragm $t$ to pass to a power operated fuel control valve $z$ connected with the device $n$ and cut off or reduce the flow of fuel to the burner.

When this has happened it is first necessary to raise the level of the water in the vessel $a$ to its normal height; this is effected by introducing sufficient water into the boiler associated with the device. The steam and water connections between the boiler and the device are of course provided with cocks or valves as is usual in such installations and as soon as the water level is re-established both the steam cock and water cock are closed. The fitting $v$ is now removed and the unit $n$ comprising the plunger $p$, perforating device $q$, diaphragm $t$ and fitting $u$ is withdrawn; the element $g$ is replaced in the frame $f$ by inserting a rod through the bore of the housing $n'$ as illustrated in Figure 6, said element $g$ during the replacing action being guided into place by an inclined plane $m'$ suitably disposed relative to the chamber $m$ and the frame $f$. When the element $g$ is in place, a repair unit $n$ as illustrated in Figure 7 is introduced and the fitting $v$ replaced and connected up.

It will be seen that a repair unit $n$ cannot properly be introduced until the element $g$ has been replaced in the frame $f$ as when the unit with the perforated diaphragm is withdrawn, the element $g$ rests upon the end $s'$ of the detent $s$ and deflects the end $s^2$ thereof into the bore of the housing $n'$. The detent $s$ is so balanced however that when the element $g$ is removed the end $s^2$ drops back into the recess provided and offers no obstruction.

Obviously the element $g$ will not be retained in the frame $f$ until the water level has risen above the predetermined plane and the detent $s$ operated by the element $g$ will prevent reinsertion of a device $n$ until the element $g$ is replaced.

I claim:—

1. A control device operated by change of liquid level comprising a vessel in communication with the liquid the change of level of which is being employed, a float in said vessel, a diaphragm having effective pressure on one side thereof, a perforating device adapted to pierce said diaphragm and allow the pressure to pass to the other side thereof, means released by the float adapted to force the perforating device through the diaphragm when the level of the liquid has reached a predetermined plane and control means adapted to be operated by the pressure passing from one side of the diaphragm to the other.

2. In a control device as claimed in claim 1 the arrangement of a seat in the lower part of the vessel below the water-line, a ball valve having a small margin of buoyancy for engaging with said seat to prevent discharge of the liquid from the vessel containing the float when the device is installed under oscillating conditions which repeatedly vary the normal water level relative to a horizontal plane and a cage for retaining the ball valve in proximity with said seat.

3. A control device operated by change of liquid level comprising a vessel in communication with the liquid the change of level of which is being employed, a float in said vessel, a pivoted frame above said float, mechanical connections between said frame and said float, an unattached element in said frame, a chamber adapted to receive and guide said unattached element when discharged, a perforating device located in the chamber and adapted to receive impact contact from the discharged element, a diaphragm adapted to be pierced by said perforating device, a control device adapted to be operated by pressure passing through the perforated diaphragm a pivoted detent operated by the discharged element adapted to prevent replacement of the perforating device until the discharged element has been replaced, an inclined plane above said chamber, adapted to guide said unattached element into its seat in the frame when said element is raised, a ball having a small margin of buoyancy, a seat for said ball in the lower part of the vessel containing the float and a cage adapted to limit the movement of the ball relative to its seat substantially as described.

In testimony whereof I have signed my name to this specification.

ARTHUR RONALD TRIST.